(12) United States Patent
Gibb (10) Patent No.: US 8,109,126 B1
(45) Date of Patent: Feb. 7, 2012

(54) METHOD AND APPARATUS FOR SENSOR CALIBRATION IN A DEWATERING SYSTEM

(75) Inventor: Robert F. Gibb, Escondido, CA (US)

(73) Assignee: SEEwater, Inc., San Jacinto, CA (US)

( * ) Notice: Subject to any disclaimer, the term of this patent is extended or adjusted under 35 U.S.C. 154(b) by 660 days.

(21) Appl. No.: 12/246,265

(22) Filed: Oct. 6, 2008

(51) Int. Cl.
*G01F 19/00* (2006.01)
(52) U.S. Cl. ...................................... 73/1.73
(58) Field of Classification Search ............ 73/1.73
See application file for complete search history.

(56) References Cited

U.S. PATENT DOCUMENTS

| | | | |
|---|---|---|---|
| 4,131,773 A | 12/1978 | Maham et al. | |
| 4,258,422 A * | 3/1981 | Dougherty et al. | 73/304 C |
| 4,320,394 A | 3/1982 | John, Jr. | |
| 4,586,033 A | 4/1986 | Andrejasich | |
| 4,663,614 A | 5/1987 | Rauchwerger | |
| 4,682,156 A | 7/1987 | Wainwright | |
| 4,728,941 A | 3/1988 | Andrejasich | |
| 4,800,372 A | 1/1989 | Poteet | |
| 4,804,936 A | 2/1989 | Sale | |
| 4,818,976 A | 4/1989 | Schmitt et al. | |
| 4,827,246 A | 5/1989 | Dolan et al. | |
| 4,989,452 A | 2/1991 | Toon et al. | |
| 5,005,005 A | 4/1991 | Brossia et al. | |
| 5,264,368 A | 11/1993 | Clarke et al. | |
| 5,287,086 A | 2/1994 | Gibb | |
| 5,305,779 A | 4/1994 | Izaguirre | |
| 5,463,378 A | 10/1995 | Gibb | |
| 5,507,178 A | 4/1996 | Dam | |
| 5,550,532 A | 8/1996 | Marshall | |
| 5,628,350 A | 5/1997 | Gibb | |
| 5,802,910 A | 9/1998 | Krahn et al. | |
| 5,856,783 A | 1/1999 | Gibb | |
| 6,203,281 B1 | 3/2001 | Gurega | |
| 6,414,598 B2 | 7/2002 | Freill et al. | |
| 6,476,723 B1 | 11/2002 | Campbell et al. | |
| 6,857,313 B2 * | 2/2005 | Williamson | 73/304 C |
| 6,885,306 B2 | 4/2005 | Holzman et al. | |
| 7,199,388 B2 | 4/2007 | Omatoi | |
| 2002/0174705 A1 * | 11/2002 | Berndorfer | 73/1.02 |
| 2004/0036618 A1 | 2/2004 | Ku et al. | |
| 2005/0179448 A1 * | 8/2005 | Kirchner et al. | 324/686 |

FOREIGN PATENT DOCUMENTS

| | | |
|---|---|---|
| CA | 2292901 | 6/2001 |
| JP | 55151240 A2 | 11/1980 |

OTHER PUBLICATIONS

SeeWater Inc. Oil Smart Alarm System Installation Instructions in two pages.
Gemssenors Catalogue, p. A-25.

* cited by examiner

*Primary Examiner* — Hezron E Williams
*Assistant Examiner* — Alex Devito
(74) *Attorney, Agent, or Firm* — Knobbe, Martens, Olson & Bear, LLP (57) ABSTRACT

A dewatering system includes a selective calibrating sensor circuit configured to receive sensor readings from an electronic sensor, to determine if the electronic sensor is immersed in water, and to generate a control output signal accordingly. The selective calibrating sensor circuit periodically performs a self-calibration when the electronic sensor is not immersed in water to cancel the effect of potential contaminants deposited on the electronic sensor over its operating life. The selective calibrating sensor circuit inhibits calibration when the electronic sensor is immersed in water.

8 Claims, 10 Drawing Sheets

METHOD AND APPARATUS FOR SENSOR CALIBRATION IN A DEWATERING SYSTEM

BACKGROUND OF THE INVENTION

1. Field of the Invention

The present invention relates generally to a dewatering system and, in particular, relates to calibrating a sensor circuit in the dewatering system to compensate for accumulative contamination deposited on a sensor that is repeatedly immersed in water over its operating life.

2. Description of the Related Art

A dewatering system for an enclosed space, such as a sump pump for an electrical underground vault, often uses a sensor to detect for the presence of water in the enclosed space. The enclosed space is usually subject to waste water accumulation as water from rain, irrigation, leaks, and other sources enter and flood the enclosed space. The sensor is generally mounted at a fixed location in the enclosed space and generates a signal to indicate the presence of water when the sensor is immersed in water. One problem with using the sensor in a dirty environment is that there is an accumulative contamination deposited on the sensor each time the sensor is immersed in water. The sensor may become ineffective as its sensitivity is changed by the contamination. Regular maintenance, including periodic cleaning of the sensor, may be required to ensure reliable operations.

SUMMARY OF THE INVENTION

Thus, it would be advantageous to develop a method and an apparatus for calibrating a sensor circuit to cancel out (or ignore) contamination deposited on a sensor that is repeatedly immersed in water during normal operations. Regular calibration of the sensor circuit reduces the need for cleaning of the sensor which may be placed in a remote or hard to reach location (e.g., inside a transformer vault or an elevator shaft).

In one embodiment, a selective calibrating sensor circuit comprises an electronic sensor, a self-calibrating sensing circuit, and a sensor controller. The electronic sensor is configured to provide a sensor reading based on a characteristic of substances in proximity to the electronic sensor. For example, the electronic sensor is a capacitance sensor that generates the sensor reading based on a conductivity of the substances in proximity to the capacitance sensor.

The self-calibrating sensing circuit is configured to receive the sensor reading from the electronic sensor and to generate a water detection signal to indicate whether the electronic sensor is immersed in water based on the sensor reading. During calibration, the self-calibrating sensing circuit improves accuracy of the water detection signal by adjusting one or more internal parameters to null an effect on the sensor reading due to contaminants or non-water substances in contact with the electronic sensor. That is, the self-calibrating sensing circuit reduces its sensitivity to any substance that is in contact with the electronic sensor during calibration.

The sensor controller is configured to receive the water detection signal and to generate a control output signal based on the water detection signal. The sensor controller is also configured to prohibit calibration by the self-calibrating sensing circuit when the water detection signal indicates that the electronic sensor is immersed in water. The selective calibrating sensor circuit loses its ability to detect water if calibration occurs when the electronic sensor is immersed in water. Therefore, the sensor controller selectively enables calibration by the self-calibrating sensing circuit when the water detection signal does not indicate that the electronic sensor is immersed in water.

In one embodiment, the self-calibrating sensing circuit automatically conducts calibration at power-up and the sensor controller triggers subsequent calibrations in the self-calibrating sensing circuit during normal operations by temporarily interrupting power to the self-calibrating sensing circuit. That is, the sensor controller shuts off power to the self-calibrating sensing circuit for a very short time and then reapplies power to the self-calibrating sensing circuit to trigger calibrations similar to the calibration at power-up. In one application, the self-calibrating sensing circuit is powered by a primary source derived from an external AC power line and a secondary source derived from a local battery that activates during a power outage of the external AC power line to avoid inadvertent calibrations by the self-calibrating sensing circuit. For example, the local battery can be implemented with one or more standard sized (e.g., three AA) alkaline batteries that are embedded in a common potted assembly with the self-calibrating sensing circuit.

In one embodiment, the sensor controller is implemented with a microcontroller chip. The microcontroller chip includes programmable input/output ports and a microprocessor. The microcontroller chip can be programmed to run different calibration algorithms and to generate different control output signals for different applications. In one application, the water detection signal is provided to an input of the microcontroller chip and a calibration algorithm uses one or more timers to generate a pulse signal to periodically trigger calibration in the self-calibrating sensing circuit while the water detection signal does not indicate that the electronic sensor is immersed in water. In some instances, timers (e.g., counters) in the microcontroller chip may have an upper limit and thus limit a trigger period for calibration. A cascade of two or more timers can be used to lengthen the trigger period (i.e., increase an interval between calibrations).

In one application, a control output signal is configured to activate an alarm (e.g., a light or a sound) when the water detection signal indicates that the electronic sensor is immersed in water. For example, the alarm may be used to inform a remote monitoring system of possible problems (e.g., a failed pump) in a dewatering system or to provide visual and audible aid to personnel in the vicinity regarding a status of the dewatering system. In another application, a control output signal is configured to activate a water pump while the water detection signal indicates that the electronic sensor is immersed in water. The control output signal may optionally be configured to continue activating the water pump for a predetermine duration (e.g., eight seconds) after the water detector signal indicates that the electronic sensor is no longer immersed in water. The predetermined duration can be variable (e.g., by programming the microcontroller chip) and can be set according to a type of water pump being used, an enclosure's size, and the like. Allowing the water pump to remain active for the predetermined duration after the electronic sensor is no longer immersed in water avoids frequent on/off cycles for the water pump. For example, if the water pump turns off immediately (or relatively too quickly) after the electronic sensor is no longer immersed in water, the electronic sensor remains relatively close to the water level and a relatively small amount of additional water or a physical disturbance may trigger the water pump to become active again.

In one embodiment, a dewatering system comprises a first capacitance probe and a second capacitance probe, and a self-calibrating sensor circuit. The first capacitance probe is configured to detect for the presence of water at a first level in a container. The second capacitance probe is configured to detect for the presence of water at a second level in the container. The self-calibrating sensor circuit is configured to receive respective outputs from the first capacitance probe and the second capacitance probe and to inhibit calibrating itself when the respective outputs indicate that at least one of the first capacitance probe and the second capacitance probe is immersed in water. The self-calibrating sensor circuit is also configured to periodically calibrate itself when the respective outputs from the first capacitance probe and the second capacitance probe indicate that both the first capacitance probe and the second capacitance probe are not immersed in water. During calibration, the self-calibrating sensor circuit adjusts one or more internal reference sensing levels to cancel effects on the respective outputs of the first capacitance probe and the second capacitance probe due to deposits or non-water substances (e.g., contaminants or oil) in contact with the first capacitance probe and the second capacitance probe.

In one application, the second level is higher than the first level, and the self-calibrating sensor circuit generates a control output signal to turn on a water pump when the output of the second capacitance probe indicates that the second capacitance probe is immersed in water and to turn off the water pump when the output of the first capacitance probe indicates that the first capacitance probe is not immersed in water. In one embodiment, an interface circuit is coupled between the self-calibrating sensor circuit and the water pump. The interface circuit includes an isolation and rectification circuit that generates a substantially direct current (DC) voltage from an alternating current (AC) power line to power the self-calibrating sensor circuit. The interface circuit further includes a relay circuit that receives the control output signal. The relay circuit turns on/off the water pump by connecting/disconnecting the water pump from the AC power line through a relay switch controlled by the control output signal. In one embodiment, the water pump is a submersible pump that pumps water out of the container at a level below the first level and the second level.

In some applications, the dewatering system further includes a high liquid alarm system with one or more sensors configured to detect for presence of liquid at a level in the container that is above the first level and the second level. The high liquid alarm system sets off a local alarm or a remote alarm to alert of possible abnormal conditions. For example, water does not normally rise pass the second level unless the water pump is not functioning properly. Other abnormal conditions that can trigger an alarm include excess non-water liquids, such as oil, filling the container. In one embodiment, the high liquid alarm system uses at least one capacitance sensor with its own self-calibrating sensor circuit to provide reliable and substantially maintenance-free operations.

In one embodiment, a method for calibrating a sensor comprises providing a first sensor reading from a first capacitance sensor to a sensing circuit and comparing the first sensor reading with a first reference sensing level in the sensing circuit to generate a first water detection signal that indicates whether the first capacitance sensor is immersed in water. The method further comprises executing a calibration algorithm that disables calibration of the sensing circuit when the first water detection signal indicates that the first capacitance sensor is immersed in water and selectively enables calibration of the sensing circuit when the first water detection signal does not indicate that the first capacitance sensor is immersed in water. The first reference sensing level is adjusted during calibration to effectively cancel errors in the first sensor reading due to accumulative contamination deposited on the first capacitance sensor. The first water detection signal can also be used to generate an output signal to control a water pump or an alarm in a dewatering system.

In one implementation, the calibration algorithm selectively enables calibration of the sensing circuit by periodically shutting off power to the sensing circuit and reapplying power to the sensing circuit after a predefined duration when the first capacitance sensor is not immersed in water. In one embodiment, the calibration algorithm comprises incrementing a counter with a system clock when the first water detection signal indicates that the first capacitance sensor is not immersed in water, calibrating the sensing circuit when the counter reaches a predetermined number, and resetting the counter after each calibration. The counter is not updated when the first water detection signal indicates that the first capacitance sensor is immersed in water. In another embodiment, the calibration algorithm comprises incrementing a cascade of two or more counters with a system clock when the first capacitance sensor is not immersed in water and calibrating the sensing circuit when a final counter in the cascade of two or more counters reaches a predetermined number. All of the counters are reset after each calibration while none of the counters are updated when the first capacitance sensor is immersed in water.

In one application, the method further comprises providing a second sensor reading from a second capacitance sensor to the sensing circuit and comparing the second sensor reading with a second reference sensing level in the sensing circuit to generate a second water detection signal that indicates whether the second capacitance sensor is immersed in water. The calibration algorithm disables calibration of the sensing circuit when the second water detection signal indicates that the second capacitance sensor is immersed in water and periodically calibrates the sensing circuit when the first water detection signal and the second water detection signal indicate that both the first capacitance sensor and the second capacitance sensor are not immersed in water. The second reference sensing level is adjusted during calibration to effectively cancel errors in the second sensor reading due to accumulative contamination deposited on the second capacitance sensor. In one embodiment of a dewatering system, the first water detection signal and the second water detection signal are provided to a pump controller that generates a control output signal to start a water pump when the first water detection signal and the second water detection signal indicate that both the first capacitance sensor and the second capacitance sensor are immersed in water and to stop the water pump when the first water detection signal and the second water detection signal indicate that both the first capacitance sensor and the second capacitance sensor are not immersed in water.

While the invention may be described in various embodiments with reference to a dewatering system, it is intended that the invention also applies to other types of systems that benefit from selective self-calibration to compensate for sensors that become contaminated over time. Neither this summary nor the following detailed description purports to define the invention. The invention is defined by the claims.

BRIEF DESCRIPTION OF THE DRAWINGS

A preferred embodiment of the invention will now be described with reference to the drawings summarized below, which are intended to illustrate, and not limit the present invention.

DETAILED DESCRIPTION

A dewatering system, and a selective calibrating sensor circuit used in the dewatering system, will now be described with reference to the drawings. This description is intended to illustrate a preferred embodiment of the invention, and not limit the invention. The invention is defined by the claims.

Figure 1:
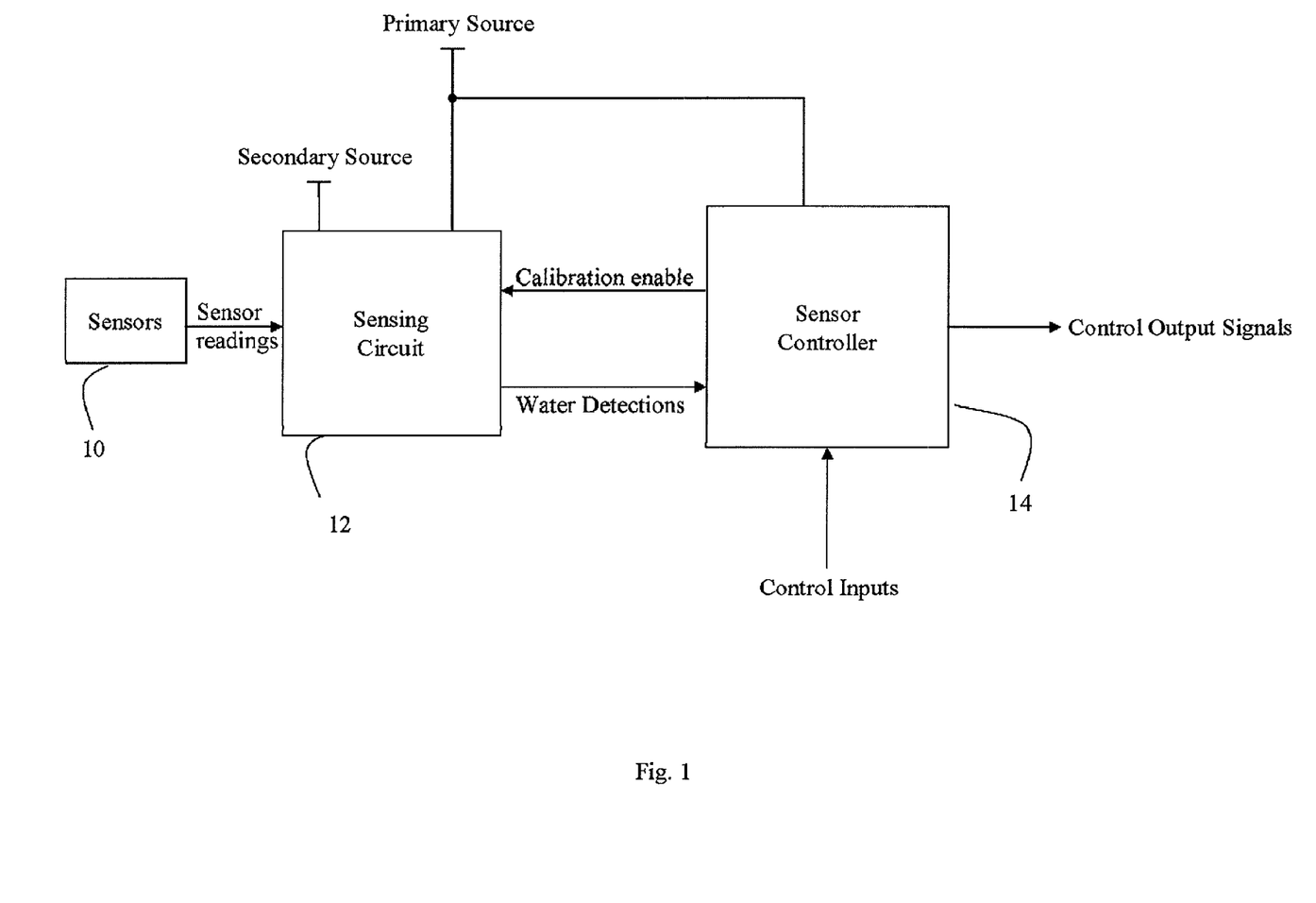
FIG. 1 is a block diagram of one embodiment of a selective calibrating sensor circuit.

FIG. 1 is a block diagram illustrating one embodiment of a selective (or intelligent) calibrating sensor circuit comprising a sensing circuit 12 and a sensor controller 14. The sensing circuit 12 receives sensor readings from one or more electronic sensors 10. In one application, the electronic sensors 10 are placed in a dewatering system to detect for the presence of water. The electronic sensors 10 may also be configured to distinguish between water and a non-water liquid such as oil. The sensing circuit 12 compares the sensor readings from the electronic sensors 10 with respective internal reference sensing levels to generate one or more respective water detection signals. The water detection signals are provided to the sensor controller 14. The sensor controller 14 generates one or more control output signals and a calibration enable signal to control calibration of the sensing circuit 12 based on the water detection signals. The sensor controller 14 is optionally programmable (e.g., by a manufacturer or by a user) to perform different calibration routines and/or to generate different types of control output signals for different applications. For example, one or more controls inputs, such as computer instructions and/or logical input control signals, may be provided to the sensor controller 14 to define algorithms and/or logical functions for generating the calibration enable signal and the control output signals.

In one embodiment, the sensing circuit 12 automatically calibrates itself upon power-up. To prevent unintended calibrations, the sensing circuit 12 has at least one backup power source. By way of example, the sensing circuit 12 in FIG. 1 is powered by a primary source and a secondary source that takes over in the event that the primary source is absent. The primary source may be derived (e.g., rectified and/or regulated) from an external AC power line while the secondary source is a locally placed battery. The secondary source is normally inactive but becomes active for continuous operation of the sensing circuit 12 in the event that the primary source has a power outage.

In one application, the sensor controller 14 triggers calibration in the sensing circuit 12 by temporarily disrupting power to the sensing circuit 12. For example, the calibration enable signal can be a pulse signal with an inactive phase that allows the primary source or the secondary source to power the sensing circuit 12 and an active phase that blocks both the primary source and the secondary source from powering the sensing circuit 12. At the end of the active phase for the calibration enable signal, power is reapplied to the sensing circuit 12 to cause the sensing circuit 12 to automatically perform a self-calibration. In one embodiment, the calibration enable signal periodically has an active phase to trigger calibration in the sensing circuit 12 when the electronic sensors 10 are not immersed in water as indicated by the water detection signals. In other words, the sensor controller 14 inhibits (or disables) calibration of the sensing circuit 12 when any one of the electronic sensors 10 is immersed in water and enables periodic calibration of the sensing circuit 12 when all of the electronic sensors 10 are not immersed in water. The periodicity (or frequency) of the calibration enable signal are programmable or selectable through the control inputs.

During self-calibration, the sensing circuit 12 adjusts the internal reference sensing levels with respect to the sensor readings from the electronic sensors 10. When the electronic sensors 10 are out of the water, the sensor readings primarily reflect the contamination deposited (or surface contamination) on the electronic sensors 10. The sensing circuit 12 adjusts the internal reference sensing levels to cancel out the portion of the sensor readings due to contamination deposited on the electronic sensors 10. The sensing circuit 12 effectively ignores the contamination deposited on the electronic sensors 10 after the self-calibration. In some applications, the sensing circuit 12 is also allowed to calibrate when the electronic sensors 10 are immersed in non-water liquids, such as oil.

Figure 2:
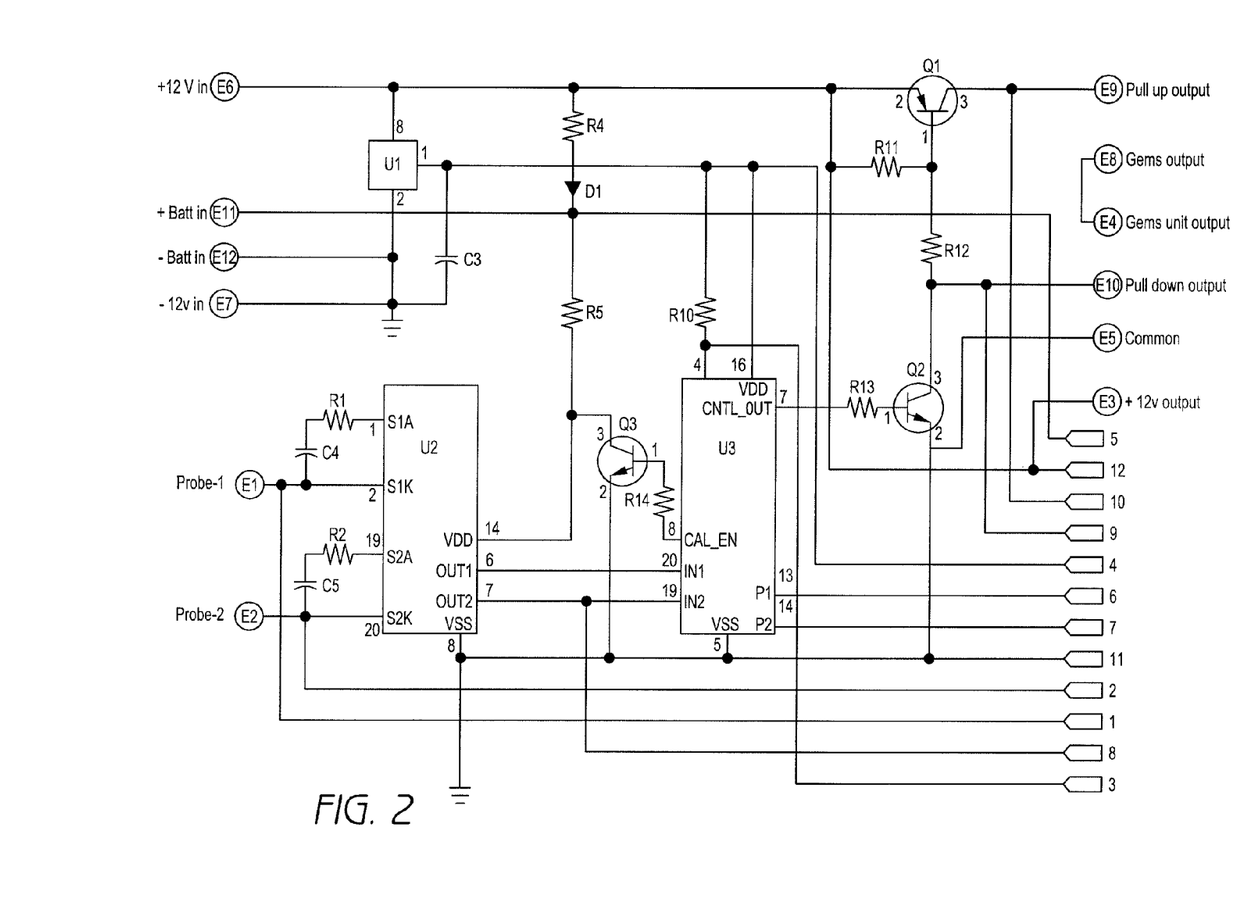
FIG. 2 is a schematic of one embodiment of a selective calibrating sensor circuit implemented with a self-calibrating sensing unit and a microcontroller chip.

FIG. 2 is a simplified schematic to show one example of a selective calibrating sensor circuit implemented with a self-calibrating sensing integrated circuit (IC) U2 and a microcontroller chip U3. In one implementation, components for the selective calibrating sensor circuit can be placed on a 1" by 2" printed circuit board with a finished circuit assembly height of less than a quarter inch (e.g., about 0.15" in one embodiment). By way of example, the simplified schematic of FIG. 2 also shows input/output pads/connectors (E1-E12) and edge connections (1-12) on the printed circuit board for electrical connections to other parts or circuit boards.

In one embodiment, the self-calibrating sensing IC U2 is a sensor IC with digital signal processing and self-calibrating capabilities, such as Quantum QT220. The self-calibrating sensing IC U2 includes one or more input terminals (e.g., SNS1A, SNS1K, SNS2A, SNS2K) configured to receive inputs from one or more electronic sensors (e.g., Probe-1, Probe-2) and to generate respective water detection signals (e.g., OUT1, OUT2). The water detection signals are provided to respective input terminals (IN1, IN2) of the microcontroller chip U3. The microcontroller chip U3 includes a microprocessor, programmable inputs/outputs, pulse generators, and timers with an on-chip oscillator to generate customized application programs. In a dewatering application, the microcontroller chip U3 runs a programmable algorithm to generate a calibration enable signal (CAL_EN) and a control output signal (CTRL_OUT) based on the water detection signals. For example, the microcontroller chip U3 may have one or more programmable terminals (PR1, PR2) configured to receive computer instructions and/or logical commands to define a calibration algorithm and a control algorithm for a particular application. That is, instructions can be provided to the programmable terminals to define logical functions between the calibration signal, the control output signal, and the water detection signals. To provide flexibility for electrical interface to subsequent devices, the control output signal from the microcontroller chip U3 is provided to a pair of transistors (Q1, Q2) configured to generate both a logical high output (pull up output) and a logical low output (pull down output) when the control output signal is active (or logic high).

In the configuration shown in FIG. 2, a first set of input pads (E6, E7) is configured to receive a first DC supply voltage (e.g., +/−12 Vac from an AC adapter) and a second set of input pads (E11, E12) is configured to receive a second DC supply voltage (e.g., voltage from a battery). The first DC supply voltage is provided to a power terminal (VDD) of the self-calibrating sensing IC U2 via serially connected resistors (R4, R5) with an isolation diode D1 inserted in between the resistors. The second DC supply voltage is provided to the power terminal of the self-calibrating sensing IC U2 via one of the resistors (R5) such that the self-calibrating sensing IC U2 is normally powered by the first DC supply voltage and alternately powered by the second DC supply voltage in the event that the first DC supply voltage suffers a power outage. The first DC supply voltage may also be provided to a voltage regulator U1 to generate a voltage of a different level for other components on the printed circuit board. For example, an output of the voltage regulator U1 is provided to a power terminal (VDD) of the microcontroller chip U3.

In one embodiment, the calibration enable signal from the microcontroller chip U3 is coupled to the power terminal of the self-calibrating sensing IC U2 via a pull-down transistor Q3. When the calibration enable signal is active (e.g., logic high), the pull-down transistor Q3 grounds the power terminal of the self-calibrating sensing IC U2 (i.e., effectively disrupts power to the self-calibrating sensing IC U2). When the calibration enable signal becomes inactive again (e.g., logic low), the power terminal of the self-calibrating sensing IC U2 receives power from the first DC supply voltage or the second DC supply voltage again and automatically calibrates itself. In one calibration algorithm, the calibration enable signal periodically pulses when the water detection signals indicate that the electronic sensors are not immersed in water. Each pulse temporarily interrupts power to the self-calibrating sensing IC U2 and triggers a self-calibration at the end of each pulse.

Figure 3:
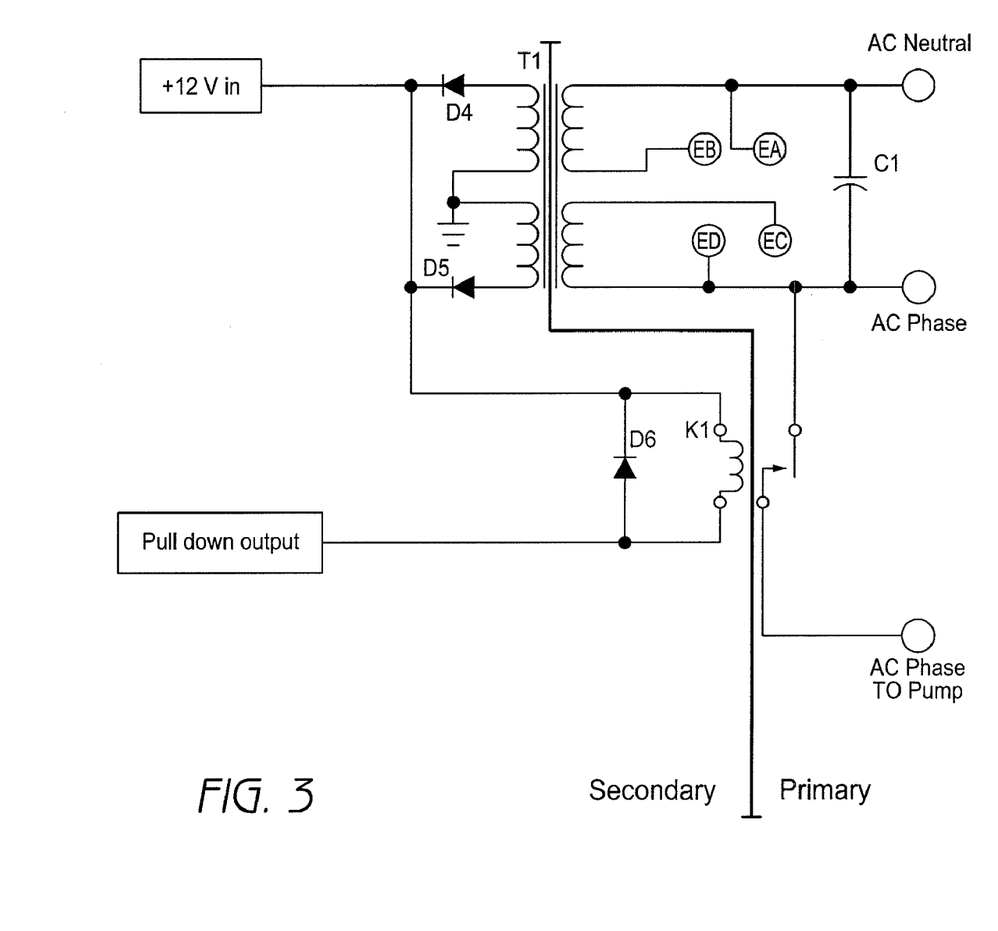
FIG. 3 is a schematic of one embodiment of an interface circuit between a selective calibrating sensor circuit and a water pump.

FIG. 3 is a schematic of one embodiment of an interface circuit between a selective calibrating sensor circuit and a water pump. By way of example, the interface circuit (or relay board) includes a rectifier circuit and a relay circuit. The rectifier circuit receives an AC input voltage (e.g., 120 Vac or 240 Vac) from a power line and generates the first DC supply voltage (e.g., +12 Vdc) to serve as a primary power source for the selective calibrating sensor circuit. The rectifier circuit includes a transformer T1 with primary windings coupled to the AC input voltage and secondary windings coupled to a pair of rectifier diodes (D4, D5) to generate the first DC supply voltage. The primary windings have jumpers (EA, EB, EC, ED) that can be configured for operation with a 120 Vac power line or a 240 Vac power line.

The relay circuit includes a relay K1 comprising a relay coil and a relay switch. The relay coil is coupled between the first DC supply voltage and a control output signal (e.g., pull down output) of the selective calibrating sensor circuit. A clamping diode D6 is coupled across the relay coil. The relay switch is coupled between the AC input voltage and the water pump. While the control output signal is active (e.g., logic low), current flows in the relay coil and the relay switch connects the AC input voltage to the water pump (e.g., a power terminal of the water pump), thereby turning on the pump. Other configurations (e.g., different logic levels or different switching devices) to interface the control output signal with the water pump are possible.

Figure 4:
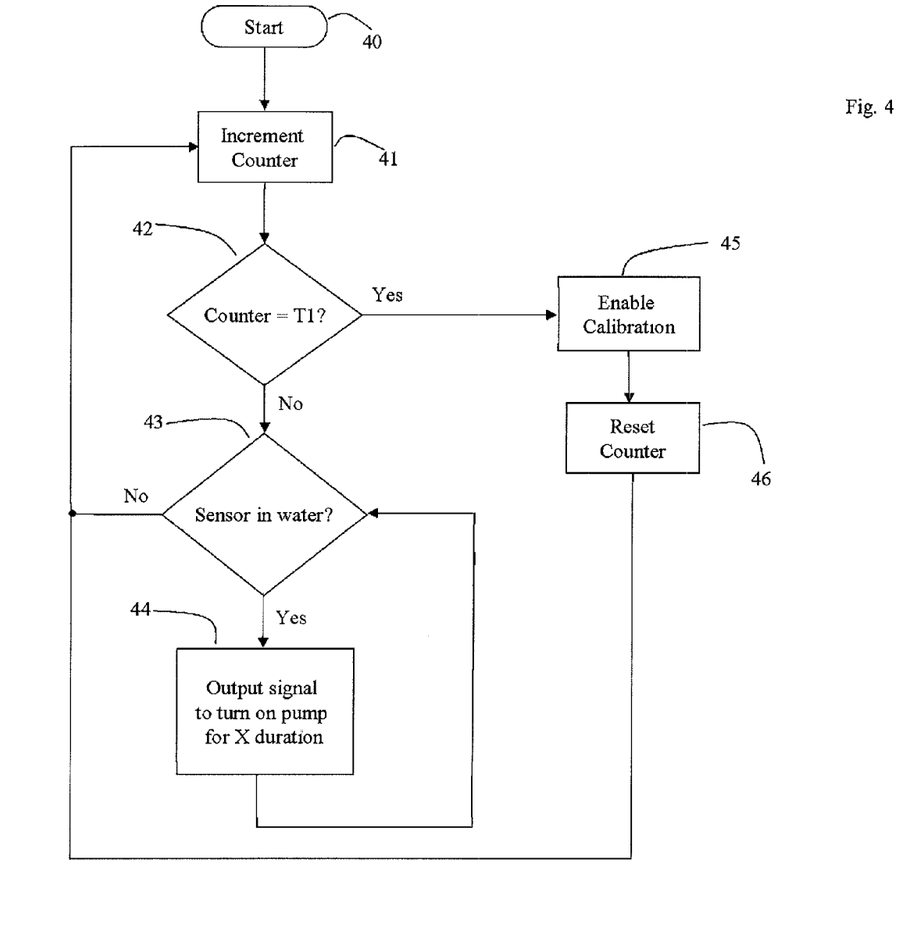
FIG. 4 is a flow chart of one embodiment of a sensor calibration process for a pump controller with one sensor probe used in dewatering applications.

FIG. 4 is a flow chart of one embodiment of a sensor calibration process for a pump controller with one sensor probe used in dewatering applications. The pump controller includes one capacitance sensor, a selective calibrating sensor circuit configured to receive a sensor reading from the capacitance sensor, and a relay circuit configured to receive a control output from the selective calibrating sensor circuit to actuate a water pump. The sensor calibration process starts at step 40 after power up, after a predetermined delay of power up or when an enable signal is provided to the selective calibrating sensor circuit. The sensor calibration process begins by incrementing a counter (or starting a timer) in the selective calibrating sensor circuit at step 41.

At step 42, the sensor calibration process determines if the counter is equal to a predefined threshold (T1) corresponding to a desired interval between calibrations. If the counter is equal to the predefined threshold, calibration is enabled at step 45 and the counter is reset at step 46 before the sensor calibration process returns to step 41. If the counter is not equal to the predefined threshold, the sensor calibration process determines if the capacitance sensor is immersed in water at step 43. If the capacitance sensor is immersed in water, the pump controller actuates the water pump for a predetermined duration (X) before returning to step 43. If the capacitance sensor is not immersed in water, the sensor calibration process returns to step 41. Thus, the sensor calibration process described in FIG. 4 periodically enables calibration of the selective calibrating sensor circuit when the capacitance sensor is not immersed in water and suspends (or inhibits) calibration while the capacitance sensor is immersed in water. The frequency of the calibration while the capacitance sensor is not immersed in water is determined by the predetermined threshold (T1). The ordering of the steps can be varied to achieve the same function.

Figure 5:
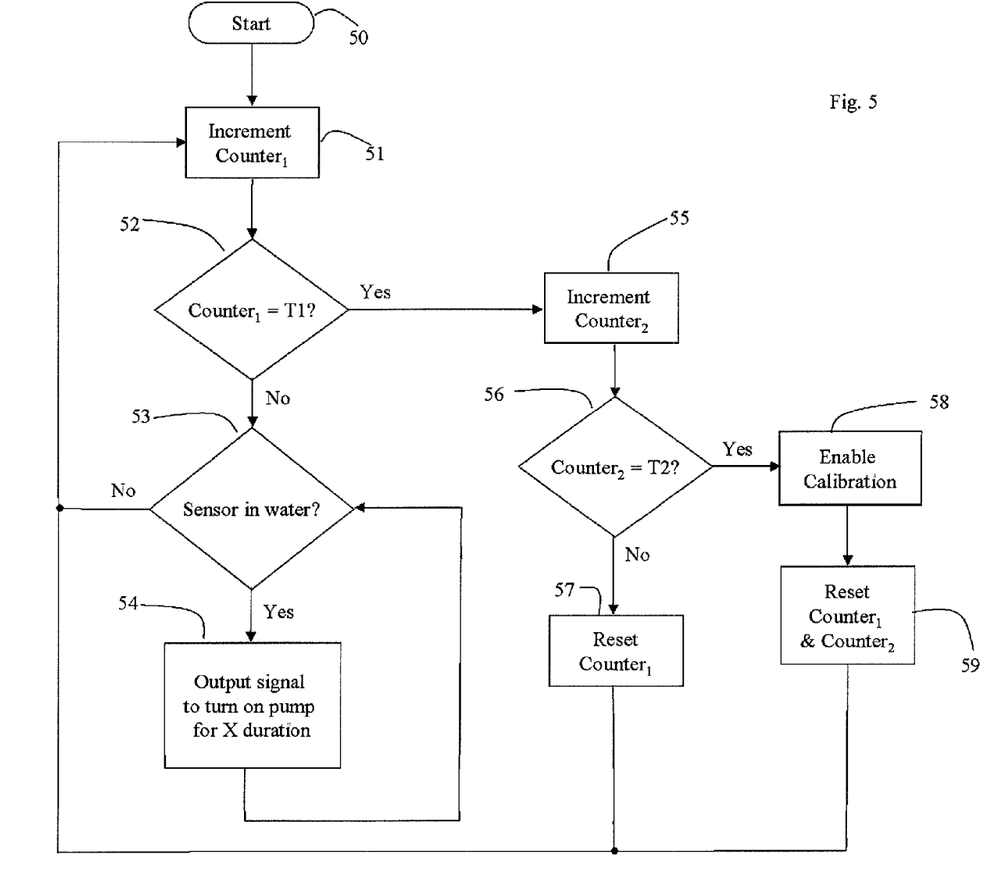
FIG. 5 is a flow chart of another embodiment of a sensor calibration process for a pump controller with one sensor probe used in dewatering applications.

FIG. 5 is a flow chart of another embodiment of a sensor calibration process for a pump controller with one sensor probe. The sensor calibration process in FIG. 5 is similar to the sensor calibration process shown in FIG. 4 with an additional counter ($Counter_2$) arranged in a cascaded configuration with a first counter ($Counter_1$). In some implementations, the sensor calibration process is executed by a microcontroller comprising counters with upper limits. The cascaded arranged of two or more counters can be used to provide a combined higher upper limit (e.g., a product of T1 and T2) and allow for a longer interval between calibrations. For example, the calibration frequency while the sensor probe is not immersed in water is determined by a mathematical product of T1 and T2 (e.g., inversely proportional to the mathematical product of T1 and T2).

Figure 6:
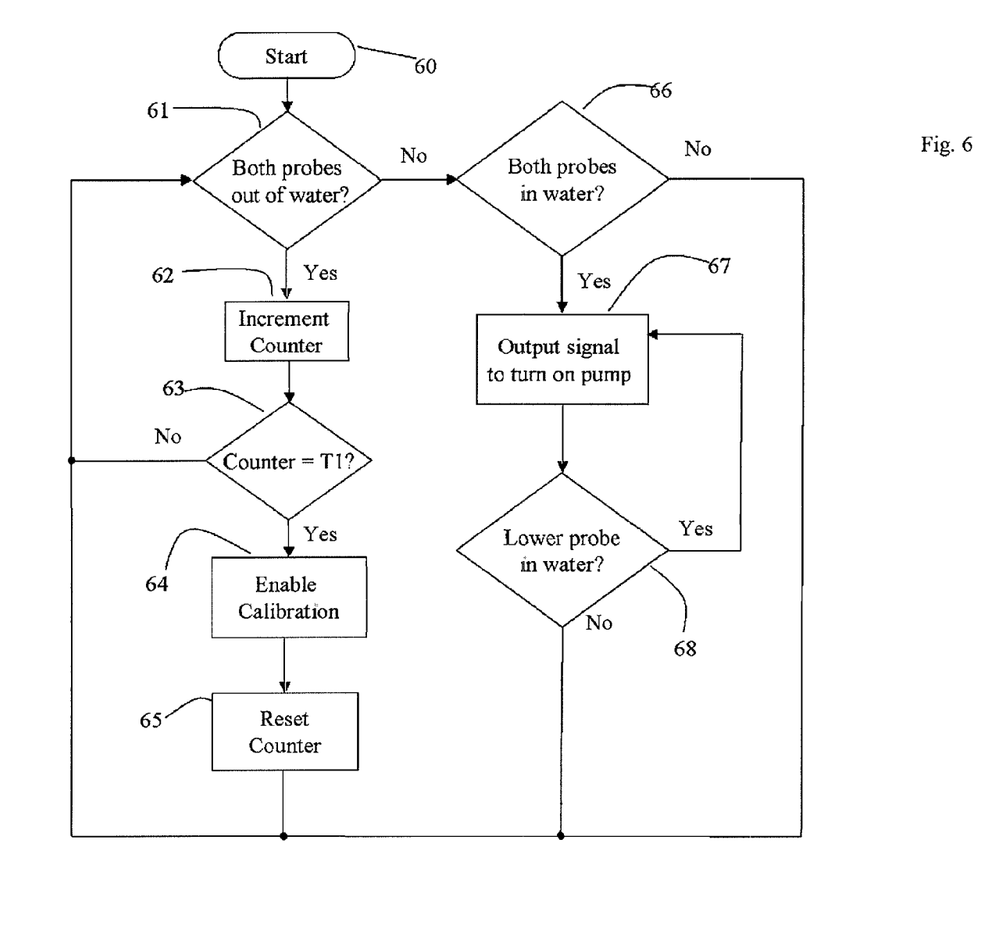
FIG. 6 is a flow chart of one embodiment of a sensor calibration process for a pump controller with two sensor probes.

FIG. 6 is a flow chart of one embodiment of a sensor calibration process for a pump controller with two sensor probes. For example, some pump controllers use two sensor probes (e.g., capacitance sensors) mounted at different levels to control on/off operations of a water pump. The water pump turns on when water reaches the capacitance sensor mounted at a higher level and turns off when the capacitance sensor mounted at a lower level no longer senses water. The sensor calibration process in FIG. 6 determines if both sensor probes are out of the water at step 61. If both sensor probes are out of the water, a counter increases at step 62 and the sensor calibration process determines if the counter is equal to a predefined threshold at step 63. Calibration is enabled at step 64 and the counter is reset at step 65 before returning to step 61 if the counter is equal to the predefined threshold. If the counter is not equal to the predefined threshold, the sensor calibration process returns to step 61.

If both sensor probes are not out of the water at step 61, the sensor calibration process determines if both sensor probes are immersed in water at step 66. If both sensor probes are not in the water, the sensor calibration process returns to step 61. If both sensor probes are in the water, the sensor calibration process effectively inhibits calibration and outputs a control signal at step 67 to turn on the water pump. After turning on the water pump at step 67, the sensor calibration process determines if the sensor probe mounted at the lower level is still immersed in water. The water pump stays on as long as the lower sensor probe is still immersed in water. Once the lower sensor probe is not in water, the sensor calibration process returns to step 61. Thus, the sensor calibration process described in FIG. 6 periodically enables calibration when both sensor probes are out of water, activates the water pump when both sensor probes are immersed in water, and continue to run the activated water pump until the lower sensor probe is no longer immersed in water.

Figure 7:
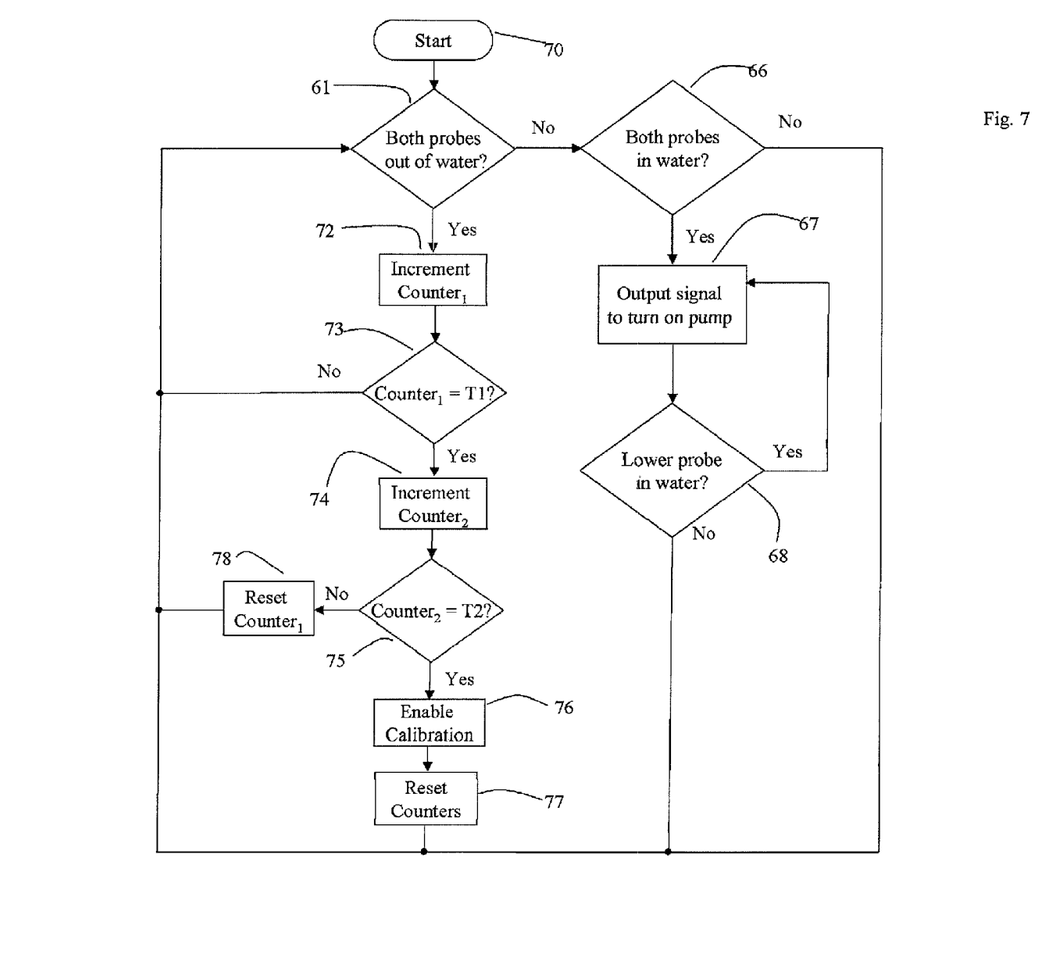
FIG. 7 is a flow chart of another embodiment of a sensor calibration process for a pump controller with two sensor probes.

FIG. 7 is a flow chart of another embodiment of a sensor calibration process for a pump controller with two sensor probes. The sensor calibration process of FIG. 7 functions similarly to the sensor calibration process of FIG. 6 and includes additional timers to potentially increase the interval (or reduce the frequency) between calibrations while the sensor probes are not immersed in water. Variations of the steps shown in FIGS. 6 and 7 are also possible.

Figure 8:
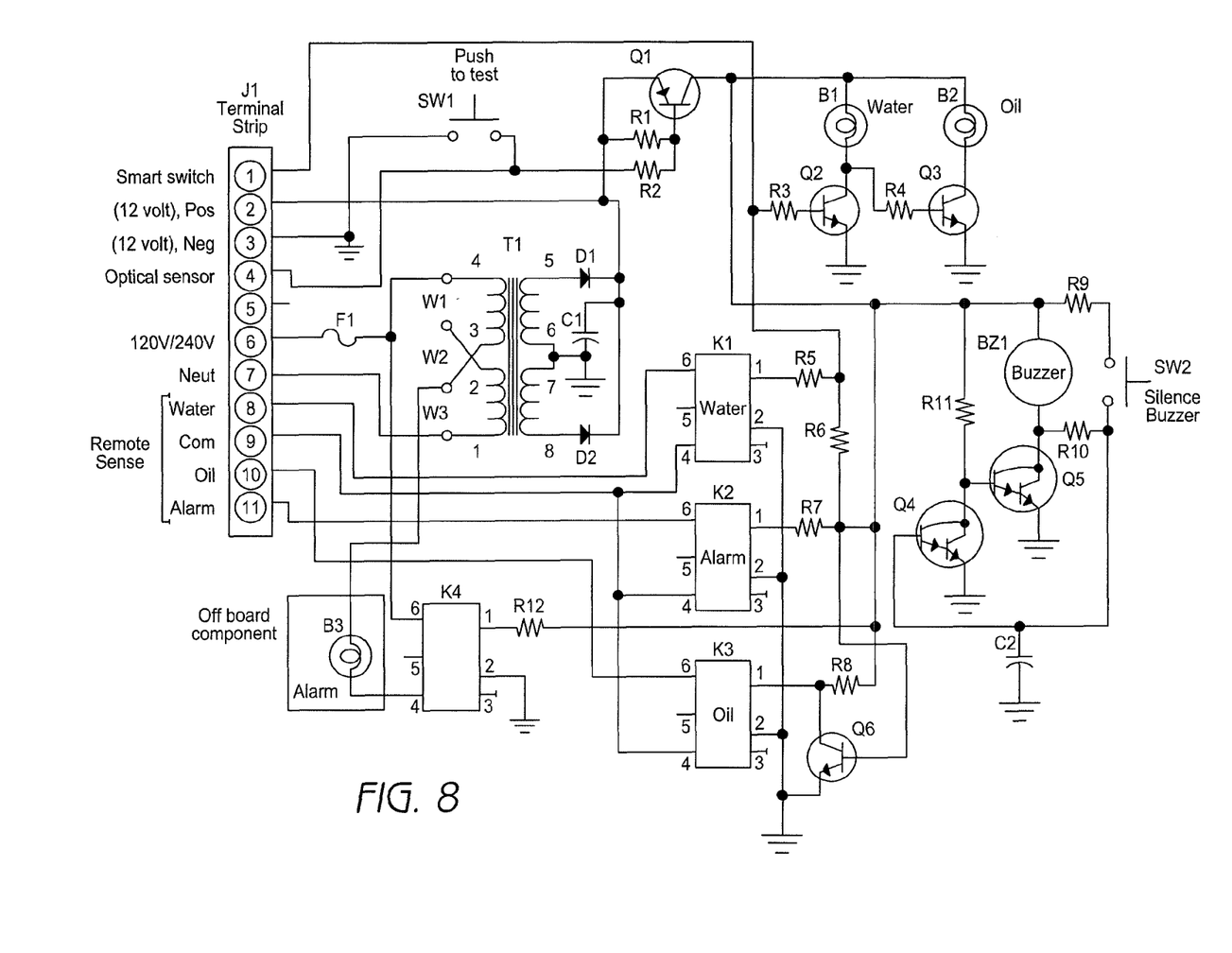
FIG. 8 is a schematic of one embodiment of an alarm system connectable to a selective calibrating sensor circuit.

In some dewatering applications, a capacitance sensor is used to sense for the presence of water and to activate an alarm rather than a water pump. FIG. 8 is a schematic of one embodiment of an alarm system connectable to a selective calibrating sensor circuit. In one application, the capacitance sensor and an optical sensor are co-located with the optical sensor configured to detect for the presence of liquid and the capacitance sensor configured to determine if the liquid is water or oil. The capacitance sensor is coupled to the selective calibrating sensor circuit which generates a control output signal based on sensor readings from the capacitance sensor.

The control output signal from the selective calibrating sensor circuit is provided to a first input terminal (e.g., J1-1 or Smart switch input) of an alarm circuit board. The optical sensor provides an output to a second input terminal (e.g., J1-4 or Optical sensor input) of the alarm circuit board. When the optical sensor detects liquid, the output of the optical sensor activates a first transistor Q1 to provide power (e.g., 12 Vdc) to the alarm circuit board and thereby activating a third transistor Q3 to light up an oil lamp B2 to indicate the presence of oil by default. If the control output signal from the selective calibrating sensor circuit is active (e.g., logic high), indicating that the capacitance sensor is immersed in water, the control output signal activates a second transistor Q2 to turn on a water lamp B1 and consequently deactivates the third transistor Q2 to turn off the oil lamp B2.

In the embodiment shown in FIG. 8, the output of the optical sensor is also provided to activate a buzzer circuit BZ1 and to solid state relay circuits K2, K3, K4 configured for sending alarms to a remote location. The control output signal is also provided to a separate solid state relay circuit K1 configured for sending an alarm to the remote location. The alarm circuit board in FIG. 8 also includes an isolation and rectification stage comprising a transformer T1 and rectifying diodes D1, D2 configured to generate a DC supply voltage (e.g., 12 Vdc) from an AC supply voltage (e.g., 120 Vac or 240 Vac) provided by a power line.

Figure 9:
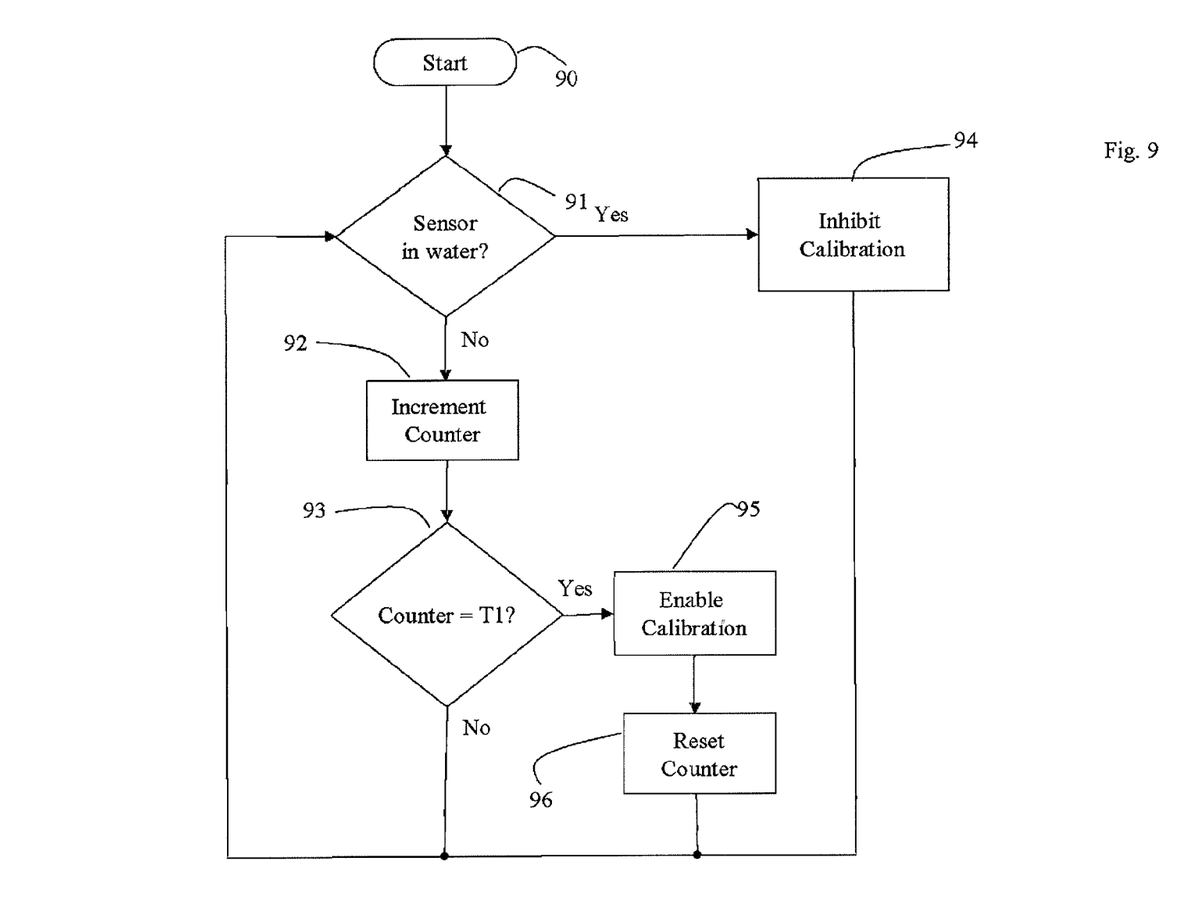
FIG. 9 is a flow chart of one embodiment of a sensor calibration process for an alarm system.

FIG. 9 is a flow chart of one embodiment of a sensor calibration process for an alarm system similar to the one shown in FIG. 8. The sensor calibration process shown in FIG. 9 is a variation of the sensor calibration process shown in FIG. 4. That is, the steps are ordered differently to achieve a similar function of enabling calibration when the capacitance sensor is not immersed in water and inhibiting calibration when the capacitance sensor is immersed in water. In FIG. 4, the water pump is activated at the same time that calibration is inhibited at step 44. In FIG. 9, an alarm (e.g., a local light or a signal to a remote location) would be activated while calibration is inhibited at step 94.

Figure 10:
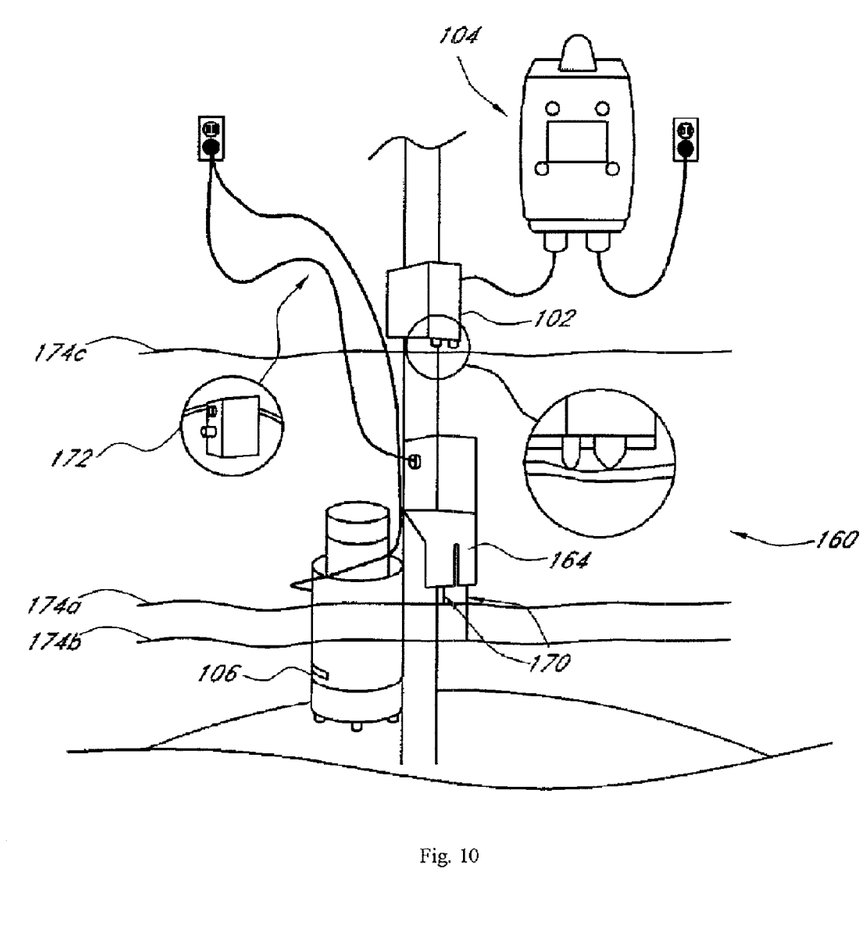
FIG. 10 illustrates one embodiment of a submersible pump control system operating in conjunction with a high water alarm system.

FIG. 10 shows in more detail one embodiment of a submersible pump control system 160 operating in conjunction with a high water alarm system 104. The submersible pump control system 160 includes a submersible pump 106 and a submersible pump controller 164 in an enclosed space. The pump controller 164 is operatively interconnected to the pump 106, configured to activate and deactivate the pump 106 based on present conditions, as described below. The pump controller 164 utilizes sensors which may include, but are not limited to, capacitance-based sensors, conductivity probes, dielectric sensors, and/or combinations thereof, to detect the presence or absence of water and oil. In one preferred embodiment, the pump controller 164 utilizes a capacitive-based sensor to detect the presence of oil and water, as described in U.S. Pat. No. 5,856,783. It will be appreciated that the pump controller 164 may be used in connection with a variety of pumps without departing from the scope of the invention.

As shown in FIG. 10, the pump controller 164 in a preferred embodiment possesses a pair of capacitive sensors 170 to detect the presence of water. Contaminants may accumulate on the capacitive sensors 170 over time. Outputs from the capacitive sensors 170 are provided to a selective calibrating sensor circuit in the pump controller 164. The selective calibrating sensor circuit periodically calibrates itself while the capacitive sensors 170 are out of water to desensitize the pump controller 164 to the potential contaminants on the capacitive sensors 170. The pump controller 164, in one embodiment, is electrically connected to the pump 106, interposed by an electronic relay 172. Activation of the pump 106 occurs when both capacitive sensors 170 are immersed or submerged, such as approximately at a high water level 174a, and the presence of water is detected by the pump controller 164. In this case, the pump controller 164 communicates with the relay 172 to activate an electronic switch, resulting in a flow of electrical power to the pump 106, which turns the pump 106 on. Deactivation of the pump 106 may occur when both capacitive sensors 170 are out of the water, such as approximately at a low water level 174b or when oil is detected in the water. In this case, the pump controller 164 communicates with the relay 172 to deactivate the electronic switch and to cease the flow of electrical power to the pump 106, turning the pump 106 off. An adjustable deadband is further provided in the pump controller 164, to avoid the pump 106 turning on and off with slight changes in the water level.

As further illustrated in FIG. 10, when the alarm system 104 is utilized in conjunction with the pump control system 160, the alarm system 104 is installed in a location such as above the high water line 174a of the pump control system 160. In this manner, should the pump 106 fail to activate when water reaches the high water line 174a and the water level reach a critical water level 174c at which sensors 102 of the alarm system 104 are located, the alarm system 104 will then detect the presence of water and oil and issue the appropriate alarms. In one embodiment, the sensors 102 include an optical sensor configured to detect for the presence of liquid at the critical water level 174c and a capacitance sensor configured to differentiate between water and oil at the critical water level 174c. The capacitance sensor for the alarm system 104 is also subject to contamination over time. Thus, a sensing circuit board for the alarm system 104 includes a self-calibrating sensing IC to cancel the effects of possible contamination deposited on the capacitance sensor.

Advantageously, the type of alarms raised by the alarm system 104 of the preferred embodiments may inform monitors of the nature of the problem in the enclosed space. A first alarm, indicating the presence of water, may imply a mechanical malfunction resulting in failure of the pump control system 160 to engage at the high water level 174a. Thus, this alarm may inform monitors that repair personnel should be dispatched to the location to fix the pump 106 and/or pump controller 164. A second alarm, indicating the presence of oil, in conjunction with the first alarm would imply that the pump control system 160 is functioning properly, as the pump control system 160 did not activate the pump 106 at the high water level 174a, and further inform monitors that oil is present in the enclosed space. Thus, this alarm may inform monitors that clean-up personnel should be dispatched to remove oil from the site so as to allow pumping of water from the site. Therefore, the alarm system functions both as a fault redundant system, alerting monitors that the water level has passed the high water level 174a, and also as a diagnostic tool, informing monitors of possible causes for why the water level has risen above the high water level 174a. In this manner, mechanical problems leading to water accumulation in enclosed spaces may be quickly identified, diagnosed, and remedied, saving time and money.

While certain embodiments of the inventions have been described, these embodiments have been presented by way of example only, and are not intended to limit the scope of the inventions. For example, while some of the above embodiments have been described with reference to dewatering systems, the invention also applies to other types of systems that use electronic sensors in potentially dirty environments. Indeed, the novel methods and systems described herein may be embodied in a variety of other forms. Furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A selective calibrating sensor circuit comprising:
    an electronic sensor configured to provide a sensor reading based on a characteristic of substances in proximity to the electronic sensor;
    a self-calibrating sensing circuit configured to receive the sensor reading from the electronic sensor and to generate a water detection signal to indicate whether the electronic sensor is immersed in water based on the sensor reading, wherein the self-calibrating sensing circuit adjusts one or more internal parameters during calibration to null an effect on the sensor reading due to contaminants or non-water substance in contact with the electronic sensor; and
    a sensor controller configured to receive the water detection signal, to generate a control output signal based on the water detection signal, to prohibit calibration by the self-calibrating sensing circuit when the water detection signal indicates that the electronic sensor is immersed in water, and to selectively enable calibration by the self-calibrating sensing circuit when the water detection signal does not indicate that the electronic sensor is immersed in water.

2. The selective calibrating sensor circuit of claim 1, wherein the electronic sensor is a capacitance sensor that generates the sensor reading based on a conductivity of the substances in proximity to the capacitance sensor.

3. The selective calibrating sensor circuit of claim 1, wherein the self-calibrating sensing circuit automatically conducts calibration at power-up and the sensor controller triggers subsequent calibrations in the self-calibrating sensing circuit during normal operations by temporarily interrupting power to the self-calibrating sensing circuit.

4. The selective calibrating sensor circuit of claim 3, wherein the self-calibrating sensing circuit is powered by a primary source derived from an external AC power line and a secondary source derived from a local battery that activates during a power outage of the external AC power line to avoid inadvertent calibrations by the self-calibrating sensing circuit.

5. The selective calibrating sensor circuit of claim 1, wherein the sensor controller comprises a microcontroller chip with a programmable calibration algorithm and programmable input/output terminals.

6. The selective calibrating sensor circuit of claim 5, wherein the programmable calibration algorithm uses one or more timers to periodically trigger calibration in the self-calibrating sensing circuit while the water detection signal does not indicate that the electronic sensor is immersed in water.

7. The selective calibrating sensor circuit of claim 1, wherein the control output signal is configured to activate a water pump while the water detection signal indicates that the electronic sensor is immersed water and to continue activating the water pump for a predetermined duration after the water detection signal indicates that the electronic sensor is no longer immersed in water.

8. The selective calibrating sensor circuit of claim 1, wherein the control output signal is configured to activate an alarm when the water detection signal indicates that the electronic sensor is immersed in water.

* * * * *